United States Patent [19]

Nakanishi et al.

[11] Patent Number: 5,499,052
[45] Date of Patent: Mar. 12, 1996

[54] SINGLE-UNIT VIDEO CAMERA-RECORDER WITH SELECTIVELY ILLUMINATED FUNCTION KEYS

[75] Inventors: Atsushi Nakanishi, Tokyo; Yukihiro Kato, Kanagawa, both of Japan

[73] Assignee: Sony Corporation, Tokyo, Japan

[21] Appl. No.: 294,947

[22] Filed: Aug. 24, 1994

[30] Foreign Application Priority Data

Aug. 25, 1993 [JP] Japan ..................... 5-210692

[51] Int. Cl.$^6$ ................................. H04N 5/225
[52] U.S. Cl. ................ 348/220; 348/373; 358/906
[58] Field of Search .................... 348/220, 373, 348/376, 221; 358/906; H04N 5/225, 5/232

[56] References Cited

U.S. PATENT DOCUMENTS

| 4,885,643 | 12/1989 | Ichimura et al. | 348/373 X |
| 5,162,915 | 11/1992 | Idera et al. | 358/906 X |
| 5,303,062 | 4/1994 | Kawarai et al. | 348/373 X |

FOREIGN PATENT DOCUMENTS

| 5-183786 | 7/1993 | Japan | H04N 5/225 |
| 5-207346 | 8/1993 | Japan | H04N 5/225 |

*Primary Examiner*—Wendy R. Greening
*Attorney, Agent, or Firm*—Ronald P. Kananen

[57] ABSTRACT

A single unit video camera-recorder operable either in camera or video mode comprises a mode switch for setting the camera or video mode of the single-unit video camera-recorder, function keys for instructing functions of the single-unit video camera-recorder, a light source for illuminating the function keys, and a controller for controlling the light to illuminate the function keys only when the single-unit video camera-recorder is set either in the camera or video mode.

5 Claims, 6 Drawing Sheets

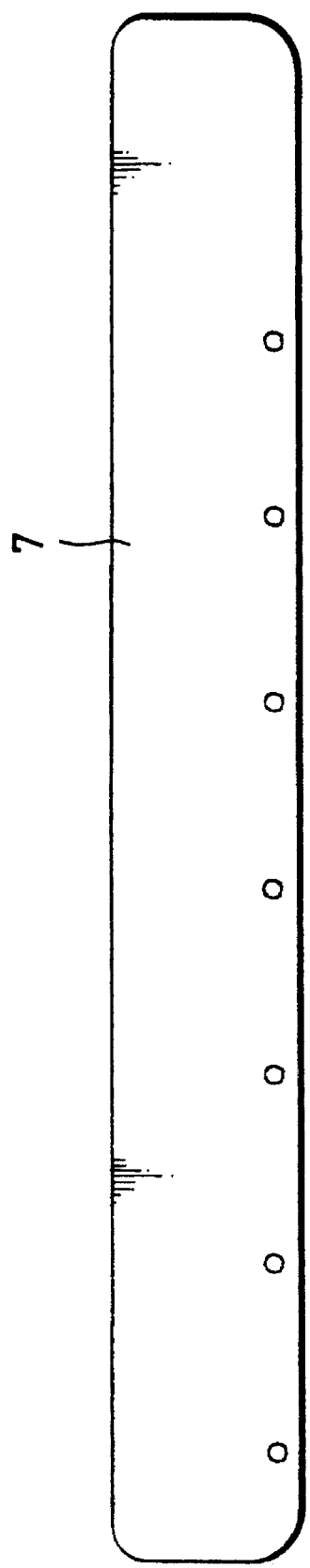
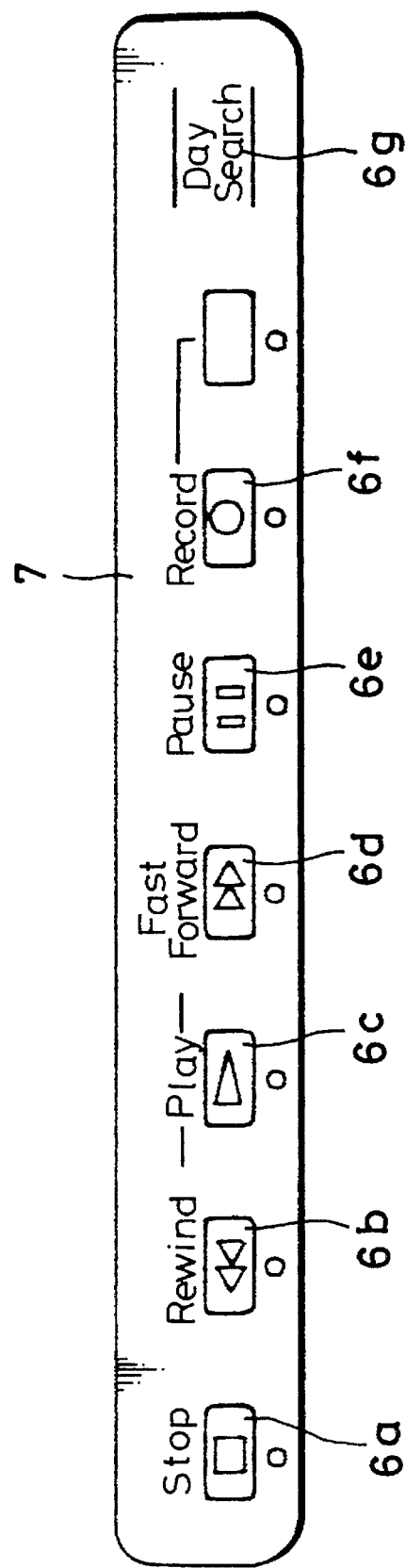
FIG. 5A
FIG. 5B

SINGLE-UNIT VIDEO CAMERA-RECORDER WITH SELECTIVELY ILLUMINATED FUNCTION KEYS

BACKGROUND OF THE INVENTION

The present invention relates to a switch mechanism for use with a single-unit video camera-recorder operable in the camera or video mode.

Heretofore, a single-unit video camera-recorder is operable in the camera or video tape recorder mode (simply referred to hereinafter as "video mode") and includes a number of switches disposed on the surface of its housing. These switches are composed of switches to enable the single-unit video camera-recorder to operate in the camera or video mode. The single-unit video camera recorder requires much more switches in order to obtain plenty of special functions.

However, if the single-unit video camera-recorder had required much more switches in order to enrich the camera function and the video tape recorder function, the risk that the user of the single-unit video camera-recorder operates wrong switches would be increased. Therefore, the single-unit video camera-recorder seems to be difficult to handle. If the single-unit video camera-recorder had been used in the camera mode, VTR-side switches could be removed.

Some single-unit video camera-recorders include function keys. The function keys are not used usually and can therefore be closed by a manually-openable and closable cover. If this cover had to be opened and closed at the same time when the user handles the single-unit video camera-recorder, the cover would not be sufficient from a handling standpoint.

SUMMARY OF THE INVENTION

In view of the aforesaid aspect, it is an object of the present invention to provide a switch mechanism for a single-unit video camera-recorder in which switches are easy to handle.

As an aspect of the present invention, a single-unit video camera-recorder operable either in camera or video mode is comprised of a mode switch for setting the camera or video mode of the single-unit video camera-recorder, function keys for instructing functions of the single-unit video camera-recorder, a light source for illuminating the function keys, and a controller for controlling the light to illuminate the function keys only when the single-unit video camera-recorder is set either in the camera or video mode.

In this single-unit video camera-recorder, the light source for illuminating the function keys is preferably formed of a light emitting diode.

In the single-unit video camera-recorder, when a predetermined function key of the illuminated function keys is pressed, the predetermined pressed key is illuminated with high intensity of illumination as compared with other illuminated function keys.

The single-unit video camera-recorder includes operation switches formed of the function keys and the function keys are illuminated only when the single-unit video camera-recorder is set either in the camera or video mode. Therefore, the user can learn the mode of the single-unit video camera-recorder from the illuminated state of the function keys. Thus, the user can be prevented from operating wrong keys and the single-unit video camera-recorder becomes much easier to handle.

BRIEF DESCRIPTION OF THE DRAWINGS

FIGS. 5A and 5B are plan views used to explain the illuminated state and the not-illuminated state of the function keys.

DETAILED DESCRIPTION OF THE PREFERRED EMBODIMENT

A switch mechanism for a single-unit video camera-recorder according to an embodiment of the present invention will be described below with reference to the drawings.

Figure 1:
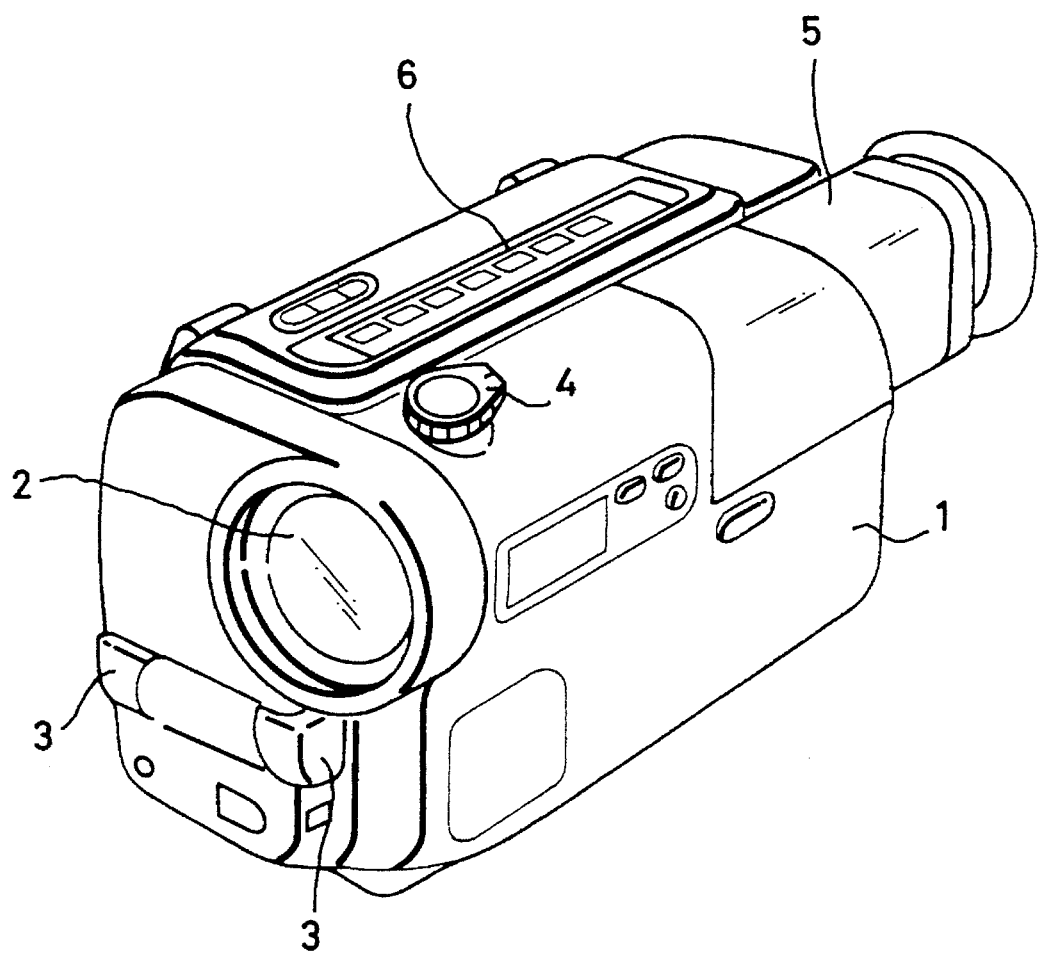
FIG. 1 is a perspective view showing an outer face of a single-unit video camera-recorder according to an embodiment of the present invention.
Figure 2:
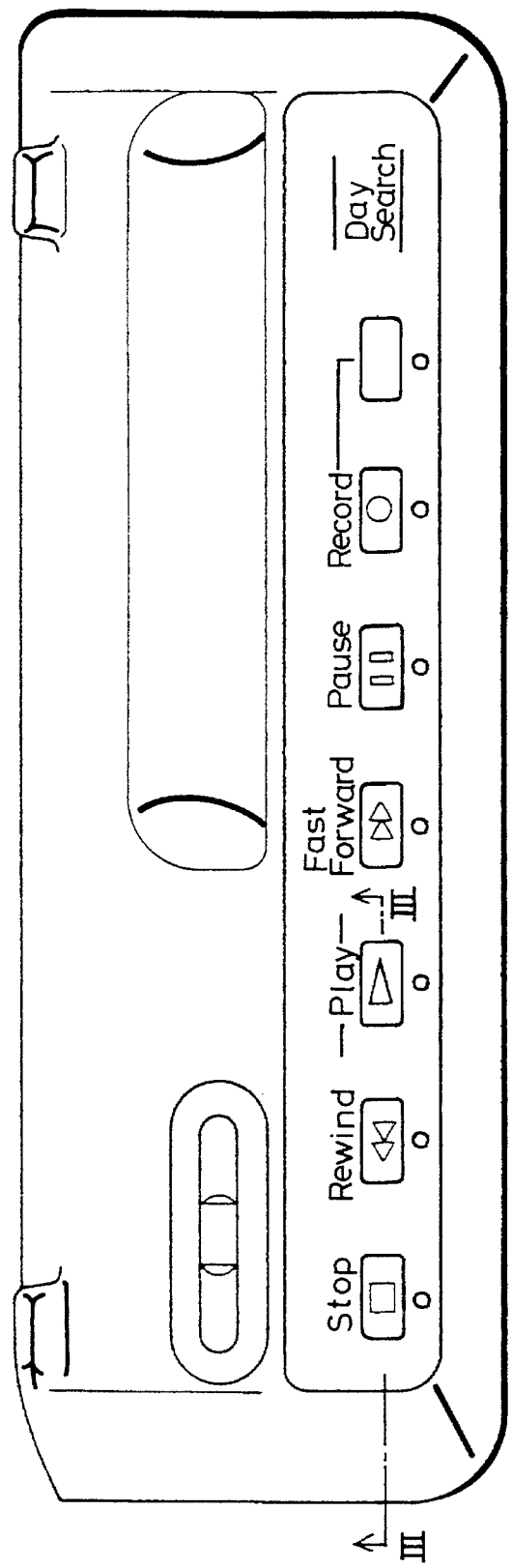
FIG. 2 is a plan view of a function key unit.
Figure 3:
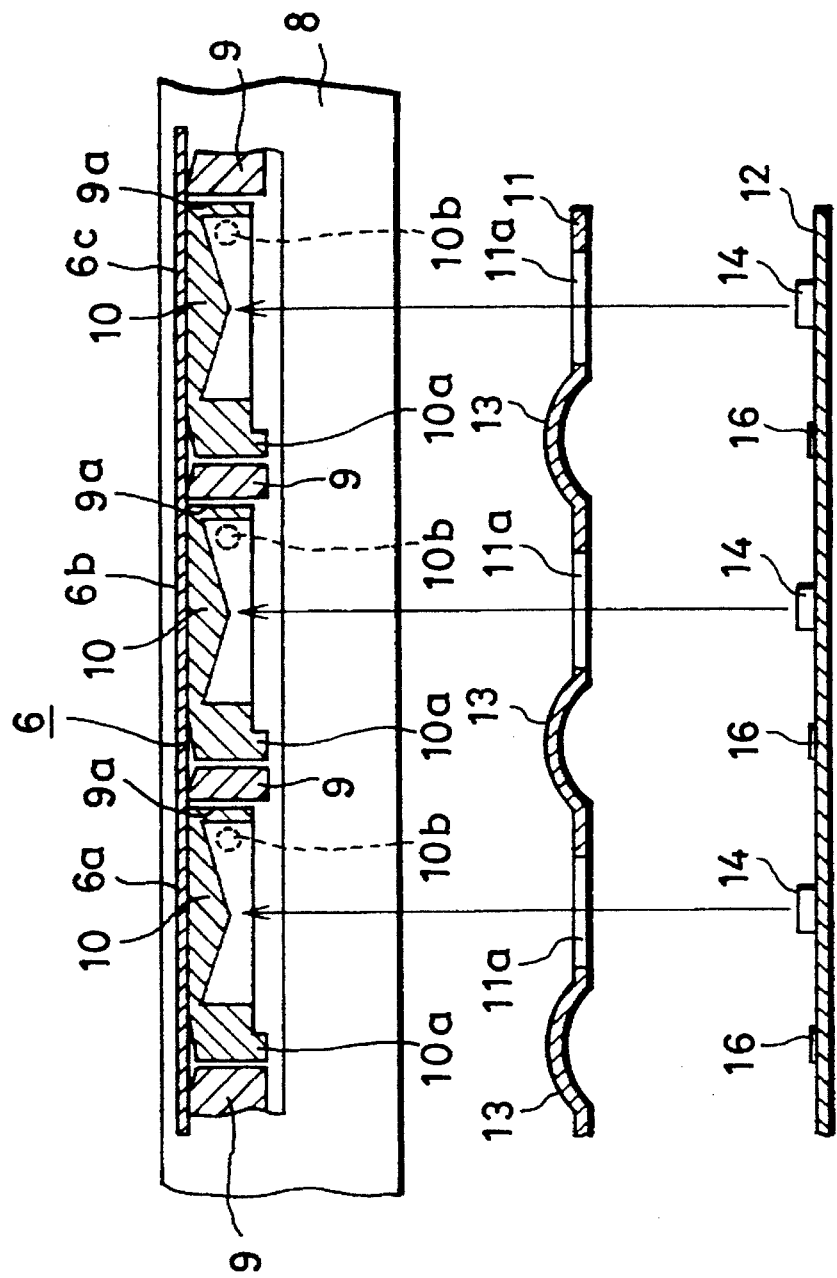
FIG. 3 is a cross-sectional view taken through the line III—III in FIG. 2 and showing in an enlarged scale flexible printed circuit boards separated from the switch mechanism.
Figure 4:
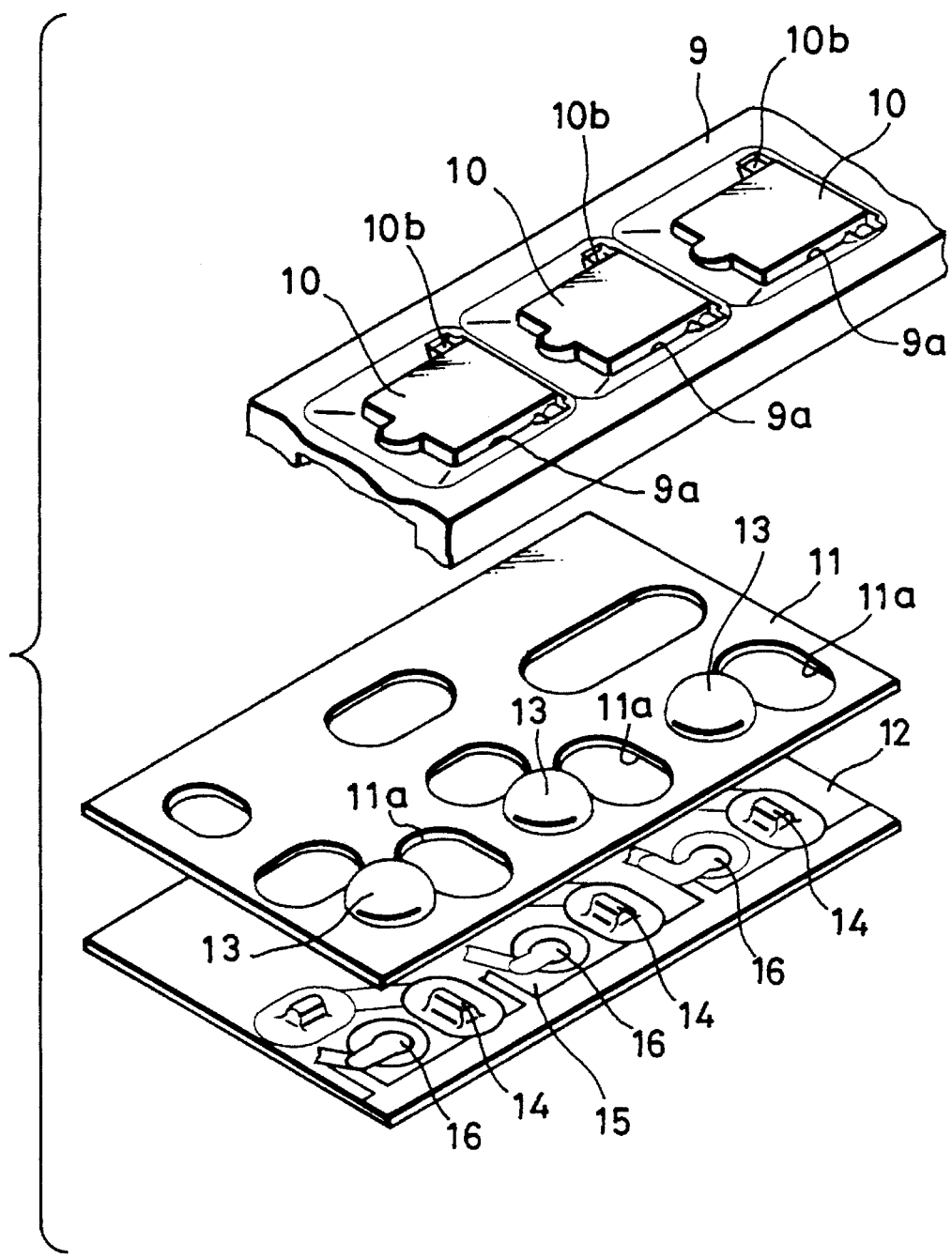
FIG. 4 is a fragmentary perspective view showing the flexible printed circuit board in an exploded fashion.

FIG. 1 of the accompanying drawings is a perspective view showing an outer face of a single-unit video camera-recorder. FIG. 2 is a plan view of a switch mechanism according to this embodiment. FIG. 3 is a cross-sectional view taken along the line III—III and showing flexible printed circuit boards separated from the switch mechanism in an enlarged scale. FIG. 4 is a fragmentary perspective view showing the flexible printed circuit board in an exploded fashion. FIGS. 5A and 5B are plan views used to explain the illuminated state of the function key unit in the video camera.

As illustrated, a single-unit video camera-recorder comprises a body 1, a camera lens unit 2, a microphone unit 3, a power supply switch 4 for switching the camera mode to the video mode or vice versa, a color viewfinder 5 and a function key pad 6 including a variety of switch buttons to effect recording, play and tape travel in the video mode.

The function key pad 6 is formed of a film-shaped sheet 7 having touch-sensitive sensor panels of switch buttons 6a through 6g on which "STOP", "REWIND", "PLAY", "FAST FORWARD", "PAUSE", "RECORD", "DAY SEARCH" are printed as shown in FIG. 2. The film-shaped sheet 7 is supported at its rear surface to a supporting member 9 attached to a frame 8 under the condition that it is held to an opening porting 8a of the frame 8. As shown in FIG. 3, the supporting member 9 includes window portions 9a opposed to the switch button panels 6a to 6g and, contact members 10, each made of substantially a transparent member, are supported at one end thereof to the window portions 9a so that the contact members 10 become rotatable about shafts 10b. Each contact member 10 includes a switch lever 10a downwardly projected from the other end thereof.

The supporting member 9 includes on its rear surface two flexible printed circuit boards 11, 12 supported in an overlapping fashion. The upper flexible printed circuit board 11 has windows 11a opposed to the contact members 10a and saucer-shaped retractable conductive plates 13 opposed to the switching levers 10a as shown in FIG. 3. The lower flexible printed circuit board 12 includes printed circuit patterns 15 having light emitting diodes (referred to hereinafter as "LEDs") 14 opposed to the windows 11a of the upper flexible printed circuit board 11 and switch patterns 16 opposed to the conductive plates 13 of the upper flexible printed circuit board 11, as shown in FIG. 4.

In the switch mechanism according to the present invention, when the power supply switch 4 is switched to the video mode side, the LEDs 14 that are disposed on the lower flexible printed circuit board 12 are energized to illuminate the switch button panels 6a through 6g of the function key pad 6.

Specifically, when the LEDs 14 are energized, rays from the LEDs 14 travel through the contact members 10 from the windows 11a of the upper flexible printed circuit board 11 to illuminate the switch button panels 6a to 6g as shown in FIG. 5B. Inasmuch as the function key pad 6 is illuminated as described above, the user can learn that the single-unit video camera-recorder is ready to operate in the video mode.

Under the condition that the function key pad 6 is illuminated, if the user depresses an arbitrary switch button panel to place the single-unit video camera-recorder in the video mode, then the switching lever 10a presses the conductive plate 13 of the upper flexible printed circuit board 11 against the switch pattern 16 through the contact member 10, and the switch pattern 16 of the lower flexible printed circuit board 12 is rendered conductive by the conductive plate 13. Then, the single-unit video camera-recorder becomes operable in the video mode and only the switch button panel that had been pressed is illuminated with high intensity of illumination as compared with other switch button panels.

When the power switch 4 is switched to the camera mode side, the LEDs 14 are de-energized to finish illuminating the switch button panels 6a to 6g of the function key pad 6 so that the user is not irritated by the existence of the function key pad 6 as shown in FIG. 5B. Therefore, the user can operate necessary switches when the video camera is in use and unnecessary switches can be made inconspicuous.

In the video mode, since only the pressed switch button panel on the function key pad 6 is illuminated with high intensity of illumination as compared with other switch button panels as described above, the user can learn the operated condition of the video camera from a difference of illumination. Therefore, the single-unit video camera-recorder becomes much easier to handle.

As described above, in the switch mechanism for the single-unit video camera-recorder according to the present invention, the LEDs 14 are energized to illuminate the switch button panels 6a to 6g by switching the power supply switch 4 to the video mode to thereby enable the user to learn the video mode. In the camera mode, the LEDs 14 are de-energized to finish illuminating the switch button panels 6a to 6g of the function key pad 6 to thereby protect the user from being annoyed by the existence of the switch button panels 6a to 6g. Therefore, the single-unit video camera-recorder becomes much easier to handle.

Further, in the video mode, since only the pressed switch button panel on the function key pad 6 is illuminated with high intensity of illumination as compared with other switch button panels, the user can learn the operated condition of the video camera from a difference of illumination. Therefore, the single-unit video camera-recorder becomes much easier to handle.

Figure 6:
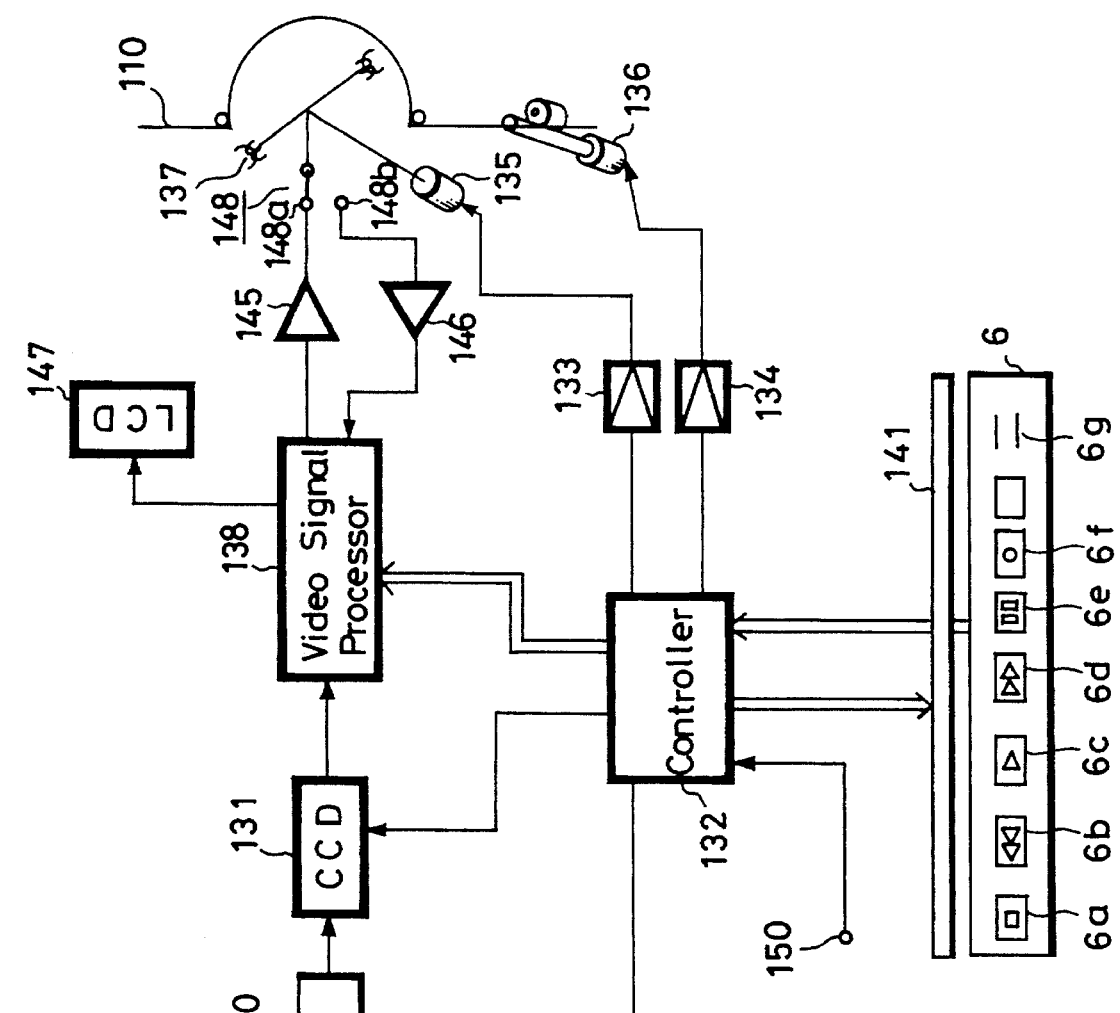
FIG. 6 is a block diagram of a single-unit video camera-recorder and to which reference will be made in explaining the illuminated state of the function keys.

Operation of the single-unit video camera-recorder will be described with reference to FIGS. 5A, 5B and FIG. 6.

As illustrated, in the camera mode, a lens block 130 functions to converge light from an object and to adjust focusing. The converged light is supplied to and converted by a CCD (charge-coupled device) 131 to an electrical signal. An output signal obtained after the light had been converted into the electrical signal by the CCD 131 is processed by a video signal processor 138 and supplied through a signal amplifier 145 and a fixed contact 148a of a switch circuit 148 to a rotary magnetic head 137, thereby being recorded on a magnetic tape 110.

When the output signal from the CCD 131 is recorded on the magnetic tape 110, a motor 135 rotates the rotary magnetic head 137 and a capstan motor 136 transports the magnetic tape 110 at a predetermined speed through amplifier drivers 133, 134 under the control of a controller 132 formed of a microcomputer.

When the recorded video signal is reproduced (i.e., video mode), a video signal reproduced from the magnetic tape 110 by the rotary magnetic head 137 is supplied through a second fixed contact 148b of the switch circuit 148 and a signal amplifier 146 to the video signal processor 138. A video signal processed by the video signal processor 138 is supplied to an LCD (liquid crystal display) device 147 and thereby reproduced and displayed on a picture screen of the LCD device 147.

In the video mode, "STOP" button 6a, "REWIND" button 6b, "PLAY" button 6c, "FAST FORWARD" button 6d, "PAUSE" button 6e, "RECORD" button 6f and "DAY SEARCH" button 6g are illuminated, i.e., switch button panels indispensable to the video mode are illuminated.

When a predetermined switch button is pressed in each mode set by a mode switch 150, a back-light 141 illuminates the pressed switch button panel with high intensity of illumination as compared with other switch button panels which are not pressed.

While the function key pad 6 is used as the video-side switch mechanism as described above, the present invention is not limited thereto and the function key pad 6 may be effectively utilized as the camera-side switch mechanism.

The switch mechanism according to the present invention is not limited to the switch mechanism of the single-unit video camera-recorder and may be applied to a wide variety of switch mechanisms of other equipments.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A single-unit video camera recorder operable either in a camera or a video mode, comprising:

a mode switch for setting said single-unit video camera-recorder in a selected one of said camera mode and said video mode;

a set of function keys for instructing functions of said single-unit video camera-recorder only in a first one of said camera mode and said video mode;

a light source for illuminating said function keys; and a controller for controlling said light source to illuminate said set of function keys only when said mode switch has switched said single-unit video camera-recorder to said first one of said camera mode and said video mode.

2. A single-unit video camera-recorder according to claim 1, wherein said light source for illuminating said function keys is formed of a light emitting diode.

3. A single-unit video camera-recorder according to claim 1, wherein when a predetermined function key of said illuminated function keys is pressed, said predetermined pressed key is illuminated with a higher intensity of illumination than other illuminated function keys.

4. A single-unit video camera-recorder operable either in a camera mode or a video mode, comprising:

- a mode switch for setting said single-unit video camera-recorder in a selected one of said camera mode and said video mode;
- a set of video mode function keys for instructing functions of said single-unit video camera-recorder only in said video mode;
- a light source for illuminating said video mode function keys; and
- a controller for controlling said light source to illuminate said set of video mode function keys only when said mode switch has switched said single-unit video camera-recorder to said video mode.

5. The single-unit video camera-recorder according to claim 4, wherein said set of video mode function keys comprise a play button, a stop button, a pause button, a fast forward button, a rewind button, and a record button.

* * * * *